Oct. 6, 1931.  J. R. OISHEI  1,826,672
WINDSHIELD PARKER
Filed Oct. 26, 1928
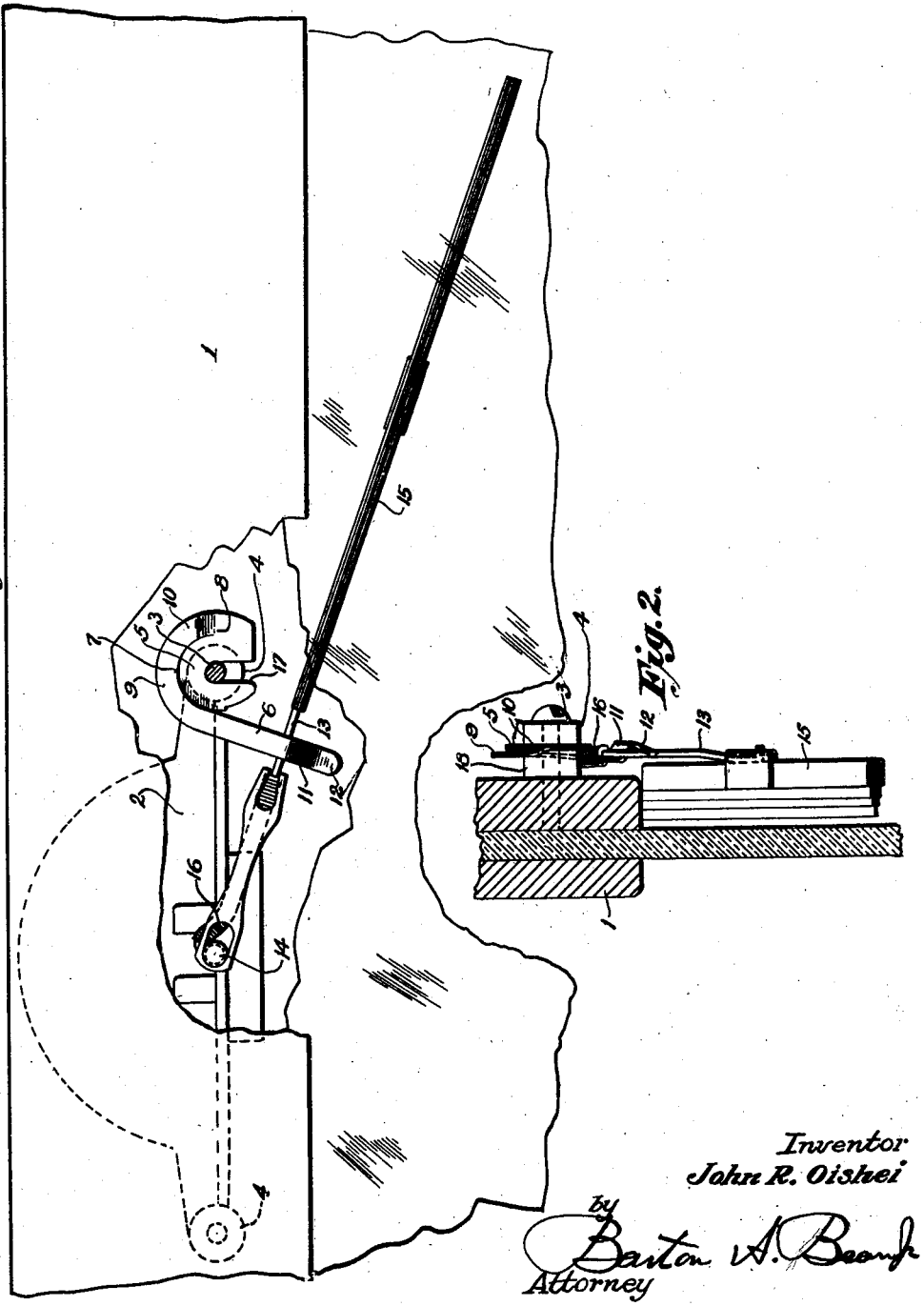
Inventor
John R. Oishei
by
Barton A. Bean Jr.
Attorney Patented Oct. 6, 1931

1,826,672

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

WINDSHIELD PARKER

Application filed October 26, 1928. Serial No. 315,245.

This invention relates to the windshield cleaner art and primarily to a construction or device for retaining the wiper blade out of or to one side of the field of vision throughout the windshield glass.

In the type of windshield cleaner in which the wiper blade is propelled over an arcuate path on the windshield glass, the windshield cleaner motor is preferably turned off so that the wiper blade will be disposed at either limit of its reciprocatory movement, in which position the wiper is elevated, and from which position the wiper has a tendency to gravitate or creep downwardly over the glass and directly across the line of vision therethrough. Especially is this true in a windshield cleaner where there is leakage about the parts thereof, or in the instances where the motor vehicle is subjected to constant or excessive jarring and vibration.

The present invention has for its aim to provide a device which is normally arranged out of the normal path of operation of the wiper and adapted to have the wiper or its supporting arm connected therewith and whereby the wiper is held against creeping downwardly over the windshield into a view-obstructing position.

A further object of the invention is to provide a parking device in which the wiper blade may normally be held against movement and spaced off the windshield glass whereby to relieve the wiper from all tension or pressure against the glass and thereby prevent early deformation of the blade which so frequently occurs when the blade remains in uninterrupted contact with the glass and under a constant pressure. Further, the invention provides a parking device which will hold the wiper arrested when its motor is inoperative but will cooperate with the wiper in effecting a release thereof when the motor is again rendered operative.

The invention also has for an object to provide a parking device in the nature of an attachment whereby it may readily be associated with windshield cleaners already installed, and also in the salient features of construction hereinafter set forth, reference being made to the accompanying drawings wherein, Fig. 1 is a fragmentary elevation of a windshield showing the application of the present invention as applied thereto.

Fig. 2 is a sectional view disclosing the wiper in its parked position and spaced from off the windshield glass.

Referring more in particular to the drawings, the numeral 1 designates the upper frame bar or header bar of a windshield on which the windshield cleaner motor 2 is mounted as by attaching bolts or screws 3 which pass through ears 4 of the motor 2.

The parker device is preferably struck out of sheet metal and comprises a base or anchoring portion 5 and a resilient or yieldable arm 6 separated from the anchoring portion by an arcuate line of shear 7 and is left integrally connected therewith at the remote side, as indicated at 8. The arcuate spring-forming portion 9, formed by the shear cut 7, is slightly offset as indicated at 10, and the free end of this arcuate portion 9 is extended off at a tangent from the opposite side of the base portion and substantially perpendicular to the wiper-carrying arm when adjacent thereto, to form said arm 6. The free end of this arm is provided with a cam shoulder 11, extending outwardly away from the glass, and an inwardly inclined extremity 12 extending toward the glass at an acute angle thereto but terminating short thereof and lying out of the normal path of operation of the wiper-carrying arm 13 which is in turn connected to the motor shaft 14 for being oscillated thereby. On its free outer end the arm 13 carries the wiper blade 15 which is normally urged into wiping contact with the windshield glass by the tensioning device 16. This offsetting of the arcuate portion 9 increases the length and resiliency of the parker arm 6, and defines the resiliency primarily within a definite area or in the arcuate section 9.

The parker is easily mounted beneath the proper one of the motor ears 4 by passing the attaching screw 4 through an opening in the base 5. This opening preferably takes the form of a slot 17 which opens downwardly through a free edge of the base and thereby facilitates the application of the parker to an already installed cleaner, since it will only be necessary to loosen the proper screw 3, then straddle the base over the latter and behind the ear 4, and finally tighten up on the screw. In cleaner mountings in which spacing washers 18 are employed, the parker is conveniently clamped between the ear and its washer, as indicated in Fig. 2.

During the normal operation of the cleaner the wiper arm 13 moves beneath the extremity 12 without meeting obstruction therefrom. When it is desired to park the wiper to one side of the field of vision, or that area cleaned by the wiper, the arm 13 is lifted outwardly and over the extremity 12 and caused to rest on the cam shoulder 11, in which position the wiper blade 15 is removed from contact with the glass. When the windshield motor 2 is again set in operation the motive power will cause the wiper-carrying arm 13 to ride downwardly over the cam shoulder 11, camming the arresting arm 6 inwardly, and as the arm rides off the extremity 12 the wiper will again be brought into wiping contact with the glass.

What is claimed is:

1. A windshield wiper parking clip comprising a one-piece body having a mounting base, a spring part integral at one end with the base and having its opposite end extended away from the base to provide an arm, the free end portion of said arm being provided with a shoulder comprising a pair of cam parts with which the wiper supporting arm is engageable for being held thereby in a parked position.

2. A windshield wiper parking clip comprising a portion adapted to be secured to a windshield header bar and a single arm extending therefrom, said arm being resilient and normally lying away from the windshield whereby the wiper may move between the arm and the windshield, said arm having a shoulder for engaging a wiper when the latter is in its limit position adjacent the clip, said shoulder comprising a pair of cam parts each receding toward the windshield, whereby the wiper may be lifted outwardly from the windshield to engage one of said cam parts and may be moved thereover to flex the arm toward the windshield and to cause the shoulder to engage the wiper, and whereby upon the initiation of a subsequent wiping movement the wiper may ride over the other of said cam parts to disengage the arm and to allow the latter to resume its normal position spaced from the windshield.

3. A parking clip comprising a one piece body having a mounting base, a coiled spring part integral at one end with the base and having its opposite end extended away from the base tangentially of the coiled spring part to provide an arm, the free end portion of said arm being provided with a shoulder with which the wiper supporting arm is engageable for being held thereby in a parked position.

JOHN R. OISHEI.